United States Patent [19]

Gladbach et al.

[11] Patent Number: 4,895,345

[45] Date of Patent: Jan. 23, 1990

[54] VALVE SOCKET FOR THE ACCOMMODATION OF THE GAS BOTTLE VALVE OF COMPRESSED GAS CONTAINER MADE OF HIGH-ALLOY CHROME-NICKEL STEELS

[75] Inventors: Karl H. Gladbach, Frechen; Martin Kesten, Rosrath, both of Fed. Rep. of Germany

[73] Assignee: Messer Griesheim GmbH, Fed. Rep. of Germany

[21] Appl. No.: 230,495

[22] Filed: Aug. 10, 1988

[30] Foreign Application Priority Data

Aug. 17, 1987 [DE] Fed. Rep. of Germany ....... 3727326

[51] Int. Cl.[4] ........................ F16K 51/00; F16K 27/08

[52] U.S. Cl. .................................... 251/144; 251/148; 137/382

[58] Field of Search ................ 251/144, 148; 137/382; 220/85 P

[56] References Cited

U.S. PATENT DOCUMENTS

| | | | |
|---|---|---|---|
| 122,517 | 1/1872 | Edson | 137/382 |
| 1,762,771 | 6/1930 | Eble | 251/148 |
| 3,101,188 | 8/1963 | Newmiller et al. | 251/148 |
| 4,332,331 | 6/1982 | Fawley | 137/382 |

*Primary Examiner*—A. Michael Chambers

*Attorney, Agent, or Firm*—Connolly & Hutz

[57] ABSTRACT

A valve socket for a gas bottle valve of compressed gas containers made of high-alloy chrome-nickel steels consists of a cylindrical neck piece welded-in in the upper cap of the container. An insert is provided with a threaded opening for the vlave. The insert is connected gas-tight and detachable with the neck piece whereby the inside diameter of the neck piece is larger than the diameter of the threaded opening of the insert.

5 Claims, 2 Drawing Sheets

VALVE SOCKET FOR THE ACCOMMODATION OF THE GAS BOTTLE VALVE OF COMPRESSED GAS CONTAINER MADE OF HIGH-ALLOY CHROME-NICKEL STEELS

BACKGROUND OF INVENTION

Compressed gas containers for the storage and distribution of ultra-pure gases are produced from stainless, high-alloy chrome-nickel steels. As a rule these are compressed gas bottles having a volume ranging from 5 to 50 liters which are produced as a welded construction from a cylindrical pipe which is seamless or has a longitudinally welded seam. This pipe is closed off by two welded-on caps. Before welding, the inside surfaces of the parts are easily accessible and can be subjected to the mechanical pretreatment for the necessary degree of roughness required for the subsequent surface quality. The quality of the inside surfaces of containers made of such high-alloy chrome-nickel steels must guarantee that the purity and composition of the contacting gases are not influenced so that it must be possible to electrolytically polish these surfaces. In conventional compressed gas bottles, the threaded opening for the valve connection is the only access to the inside of the container. As a result, electrolytic polishing becomes very difficult and, in particular, for large volume bottles requires high expenditure.

Another problem results from the use of high-alloy chrome-nickel steels as container material. Since these materials have a very low strength, compressed gas containers made from these materials must be cryodeformed.

In this process, the prefabricated container is cooled to very low temperatures and is plastically deformed as a result of internal pressure until the container material has reached the strength required for the later application.

Since a subsequent heat treatment again cancels out the strength increase produced by the cryodeformation, all welding work required for the production of the container must have been completed before the cryodeformation. This relates, in particular, to the welding-in of the valve socket for the accommodation of the gas bottle valve in the upper cap and possibly the formation of the base of the bottle near the lower cap.

Unlike for conventionally produced compressed gas containers, very special demands are made for cryodeformed containers on the container closure. The closure must resist the high internal pressure at cryogenic temperatures required for cryostretching and in this process should not lose its absolute sealing function.

SUMMARY OF INVENTION

The invention is based on the object of providing a valve socket for the accommodation of the gas bottle valve of compressed gas containers made of high-alloy chrome-nickel steels which facilitates cleaning and electrolytic polishing of the inside surface of the container and at the same time guarantees that the containers can be produced by cryodeformation and subsequently do not any longer need a thermal or mechanical post-treatment.

The invention provides for the removal of the actual valve socket with its threaded opening from the container so that a large neck opening comes free through which the inside surface of the container can be easily cleaned and electrolytically polished. Between the detachable part and the part of the valve socket welded-in in the upper container cap, a conically ground straight metallic seal is preferred as seal. Other sealing methods are possible, however, for example, a screw connection which seals via a cutting ring.

The invention also provides for access to the inside of the container after its use, for example, to examine the quality of the surface.

THE DRAWINGS

FIG. 1 shows the partial cross section overview of a compressed gas container with removable valve socket; and FIG. 2 shows the container head of FIG. 1 at an enlarged scale.

DETAILED DESCRIPTION

Figure 1:
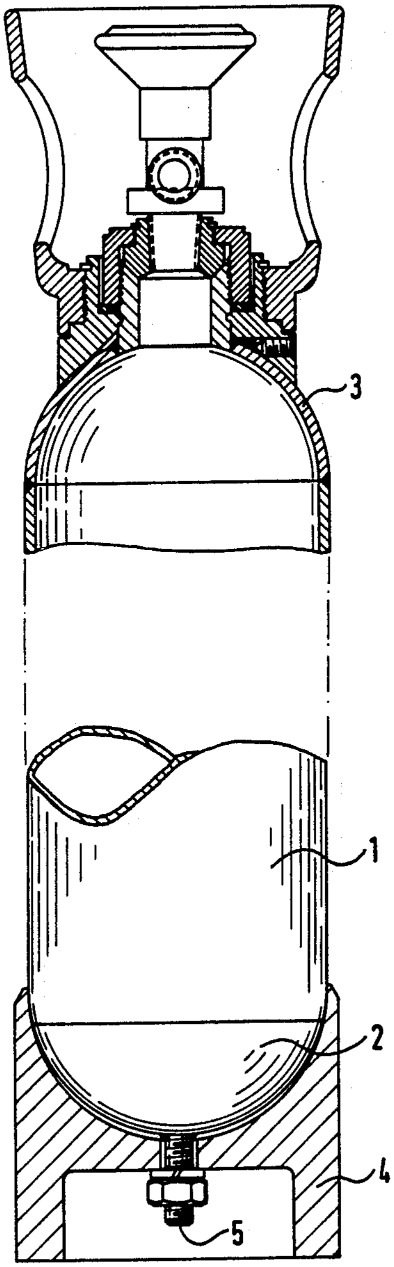

The compressed gas container made of high-alloy chrome-nickel steel shown in FIG. 1 consists of a cylindrical pipe 1 with a welded-on lower cap 2 and upper cap 3. The container base consists of a base part 4 which can be fastened to the container base by means of a threaded stem 5 welded to the lower cap 2. This container base design is particularly good since the lower cap 2 as well as the cylindrical pipe 1 during the cryodeformation can be freely and uniformly deformed. A conventionally welded upon base right, on the other hand, would impede the cryodeformation. A subsequent welding-on of a base ring to the deformed container is impossible as a result of the associated unavoidable material changes.

Figure 2:
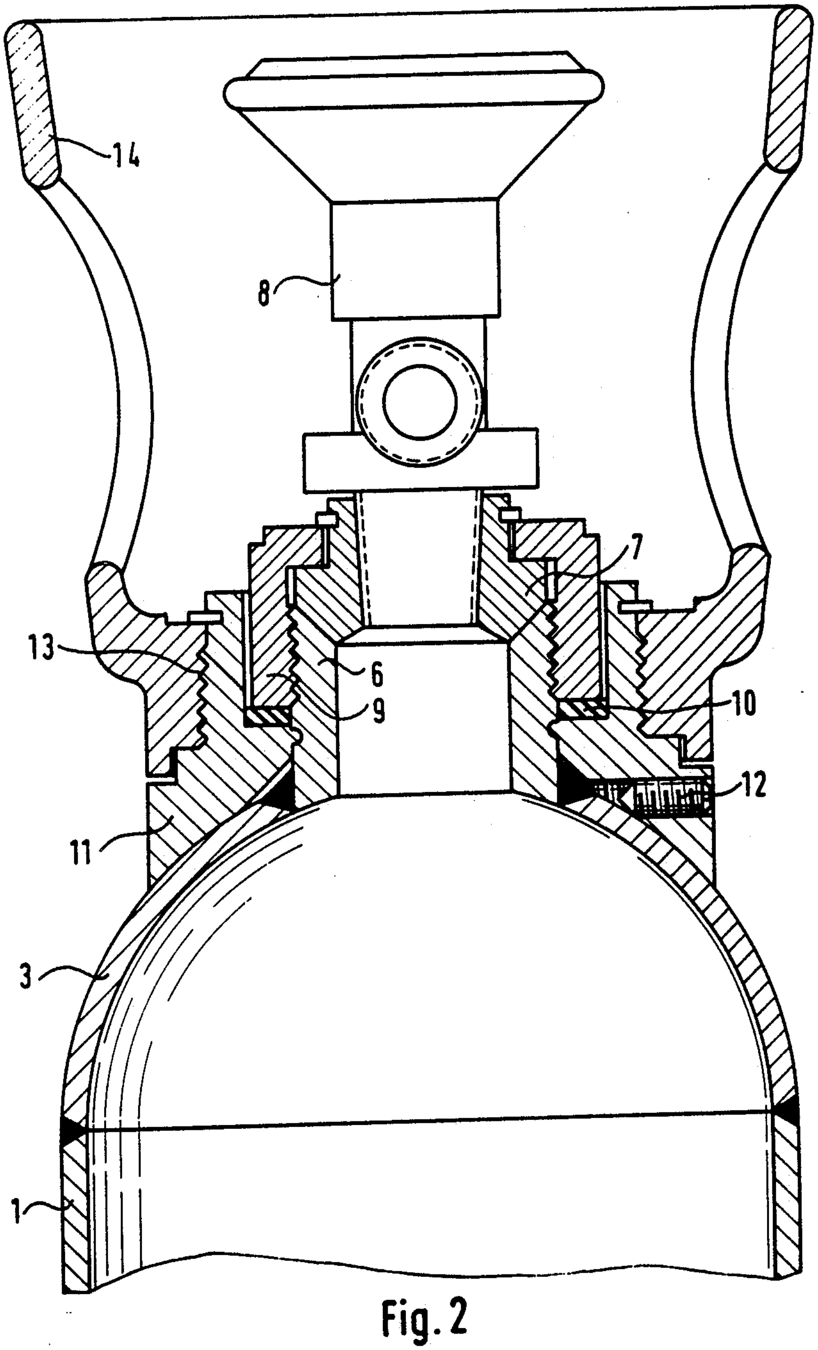

The container head is shown enlarged in FIG. 2. According to the invention, the valve socket installed in the upper cap 3 consists of a cylindrical neck piece 6 welded-in in the upper cap 3 and an insert 7 connected removably but gas-tight with this neck piece. The insert 7 contains the actual threaded opening for the gas bottle valve 8 which is welded-in in the insert 7. The insert 7 and the gas bottle valve 8 can also be produced beforehand as one component. The connection between the neck piece 6 and the insert 7 is formed as a conically ground sealing face and represents a straight metallic seal. The necessary sealing pressure is applied by a union nut 9 interconnecting the neck piece 6 and the insert 7. A neck ring 11 is pressed at the same time against the upper cap 3 by the union nut 9 by means of an elastic seal ring 10. The neck ring 11 may consist of metal or plastic. It is fixed by a stud screw 12 directed to the upper cap. Corresponding to the contours of the union nut 9, the neck ring 11 has a hexagonal recess which surrounds the lower part of the union nut 9. The neck ring 11 fixed by the stud screw 12, therefore, safeguards, the union nut 9 against rotation and unintentional opening. The outside of the neck ring 11 has an outside thread 13 so that a valve protection device 14, for example, a valve protecting cage or a valve protecting cap can be screwed on.

The straight metallic seal consisting of a conically ground sealing face between the neck piece 6 and the insert 7 represents a wholly gas-tight connection. This applies for normal operating conditions (200 bar internal pressure; ambient pressure) as well as for the conditions during cryostretching (about 600 bar internal pressure; 77K). This type of seal prevents any contamination of the gas contents from contact with threads or other sealing elements.

SUMMARY OF INVENTION

Compressed gas containers made of high-alloy chrome-nickel steels for the storage of ultra-pure gases are cryodeformed to improve the strength properties and are polished electrolytically. The only access for cleaning and electrolytical polishing of the inside of the container is provided by the narrow threaded opening of the valve socket for the gas bottle valve 8 welded-in in the upper cap 3 of the compressed gas container. In order to facilitate the accessibility, the valve socket consists of a cylindrical neck piece 6 welded-in in the upper cap and an insert 7 with the threaded opening connected gas-tight and detachable with the neck piece. The inside diameter of the neck piece is larger than the diameter of the threaded opening (FIG. 2).

What is claimed is:

1. In a valve socket of a gas bottle valve of a compressed gas container made of high-alloy chrome-nickel steels wherein the compressed gas container has an upper cap to which the valve socket is secured, the improvement being in that said valve socket consists of a cylindrical neck piece welded to said upper cap, an insert being provided with a threaded opening in which said gas bottle valve is threadably connected, mounting means detachably connecting said insert with said neck piece in a gas tight manner, and the inside diameter of said neck piece being larger than the diameter of said threaded opening of said insert.

2. Valve socket according to claim 1, characterized in that said mounting means includes a conically ground, straight metallic seal whereby the sealing pressure is applied by a union nut interconnecting said neck piece and said insert.

3. Valve socket according to, claim 2, characterized in that said mounting means further includes a neck ring pressed on said upper cap by said union nut by means of an elastic seal ring.

4. Valve socket according to claim 3, characterized in that corresponding to the contours of the union nut, said neck ring has a recess which surrounds the lower part of said union nut.

5. Valve socket according to claim 4, characterized in that said neck ring is fixed by a stud screw directed towards said upper cap.

* * * * *